United States Patent [19]

Bolton et al.

[11] 4,398,996

[45] Aug. 16, 1983

[54] VACUUM CONTROL SYSTEM AND METHOD FOR DEWATERING FABRICS

[75] Inventors: Joseph A. Bolton, Glens Falls; Jeffrey B. Duncan, Argyle, both of N.Y.

[73] Assignee: Albany International Corp., Menands, N.Y.

[21] Appl. No.: 275,299

[22] Filed: Jun. 19, 1981

[51] Int. Cl.³ .......................... D21F 1/48; D21F 11/02
[52] U.S. Cl. ..................................... 162/198; 162/199; 162/252; 162/262; 162/263; 162/274
[58] Field of Search ............... 162/252, 253, 259, 262, 162/263, 274, 198, 199, DIG. 11, 217, 317

[56] References Cited

U.S. PATENT DOCUMENTS

| | | | |
|---|---|---|---|
| 3,005,490 | 10/1961 | Justus | 162/252 |
| 3,077,924 | 2/1963 | Eastwood | 162/259 |
| 3,490,689 | 1/1970 | Hart et al. | 162/DIG. 11 |
| 3,935,061 | 1/1976 | Biornstad | 162/252 |
| 4,329,201 | 5/1982 | Bolton | 162/198 |

FOREIGN PATENT DOCUMENTS 2849881  5/1979  Fed. Rep. of Germany ...... 162/262

OTHER PUBLICATIONS

Lavigne, "Instrumentation Applications", The Foxboro Co., 1979, pp. 208–209, Miller Freeman Publications.
Mokrytzki, "Adjustable Speed Operation of AC Motors Using Slip Energy Control", *TAPPI*, vol. 64, No. 2, pp. 61–65, Feb. 1981.

Primary Examiner—Steve Alvo
Attorney, Agent, or Firm—Kane, Dalsimer, Kane, Sullivan and Kurucz

[57] ABSTRACT

A vacuum control system and method for dewatering fabrics on a papermaking machine including a suction pipe and a vacuum pump connected to the suction pipe to supply a desired vacuum level. The fabric is passed over a slot in the suction pipe so that suction applied therethrough will dewater the fabric. Controls are connected to the suction pipe and to the vacuum pump responsive to an increase in the vacuum level in the suction pipe as fabric permeability decreases to correspondingly lower the speed of the vacuum pump and retain the desired vacuum level in the suction pipe.

14 Claims, 2 Drawing Figures

VACUUM CONTROL SYSTEM AND METHOD FOR DEWATERING FABRICS

BACKGROUND OF THE INVENTION

Dewatering systems are well known in the papermaking industry. In fact, in a papermaking process there are several areas on the machinery where dewatering is a common process. For example, in the press section of the machine one or more suction pipes are connected to a source of suction and are slotted to permit passing of a fabric such as a paper maker's press felt thereacross. Applied suction through the slots and the pipes dewaters the felt and the mixture of water and air is separated in a conventional manner. Generally in this portion of the machinery, it is advisable to use a liquid ring or positive displacement type of vacuum pump.

Generally the vacuum pumps are sized for maximum demand vacuum conditions in the suction pipe when the felt or similar fabric is new. Once this vacuum set point is accomplished and the system is initiated, the vacuum pump will run at its maximum speed when the felt is new. As the felt permeability decreases with time, the vacuum level at the suction pipe automatically increases because the vacuum pump used is a constant volume unit. Various solutions have been devised to take advantage of the increased vacuum conditions such as by automatically or manually adjusting the slot width so that a greater portion of the felt is subjected to the increased vacuum conditions at any given point in time. With present concern in energy consumption, it would be an additional advantage if the energy utilized by the vacuum pump during the life of the felt is reduced. Savings in energy consumption in this manner is extremely desirable in today's paper making environment as well as any environment where energy is being used.

Naturally in dealing with the portion of the papermaking machine employing suction pipes, and where desired vacuum level is to be maintained in the pipe, it is common to use the liquid ring or positive displacement vacuum pumps for maximum effectiveness. A means of reducing energy consumption of these type of pumps is certainly desirable and would add to the overall efficiency of the papermaking machine particularly in regard to energy conservation. A natural added result would be cost savings from an energy standpoint. As stated above, prior developments in this area have generated cost savings. For example, systems have been designed which minimize horsepower requirements for vacuum pumps. These developments are disclosed in pending application Ser. No. 100,617 filed Dec. 6, 1979, now U.S. Pat. No. 4,308,077 and Ser. No. 100,814 filed Dec. 6, 1979, now U.S. Pat. No. 4,329,201.

SUMMARY OF THE INVENTION

With the above background in mind, it is among the primary objectives of the present invention to provide a unique vacuum control system for papermaking machinery in particular that portion of the machinery where suction pipes are used to dewater fabrics such as press felts. The present invention employs a variable speed drive on a liquid ring or positive displacement vacuum pump to control the maximum vacuum at a suction pipe or pipes for dewatering press felts or similar fabrics. In fact, the present system can be used on those fabrics where the air flow permeability changes with time or style. A significant advantage of the present system is in the reduction of the total energy consumed by the felt dewatering vacuum pumps.

It is an objective of the present invention to interconnect a variable speed drive motor and control circuitry including a vacuum sensor to the vacuum pump and to one or more suction pipes. It is an objective to simplify the operation of the dewatering system so that operation can be initiated by setting the maximum vacuum required to dewater a given felt at its minimum felt permeability. Once this vacuum set point has been set, the vacuum pump runs at its maximum speed when the felt is new. As the felt permeability decreases with time, the vacuum level at the suction pipe will automatically increase because the vacuum pump used is a constant volume unit. All this time the vacuum pump will run at its maximum speed, until the vacuum level has reached the set point on the controls. To maintain this desired maximum vacuum level at the suction pipe, the variable speed drive motor will be activated to start to slow down the vacuum pump as the felt permeability decreases. The lower pump speeds result in lower drive horsepower consumed. In fact, the power requirements of the vacuum pump may almost be half of what they would be in present conventional systems toward the end of a given felt life.

In summary, a vacuum control system for dewatering fabrics on a papermaking machine is provided which is particularly adaptable for that portion of the machine employing suction pipes. A vacuum pump is connected to each suction pipe to supply a desired vacuum level. Means is on the machine for passing the fabric over a slot in the suction pipe so that suction applied therethrough will dewater the fabric. Control means is connected to the suction pipe and to the vacuum pump and is responsive to an increase in the vacuum level in the suction pipe as fabric permeability decreases to correspondingly lower the speed of the vacuum pump and retain the desired vacuum level in the suction pipe.

With the above objectives among others in mind, reference is made to the attached drawing.

DETAILED DESCRIPTION

Figure 1:
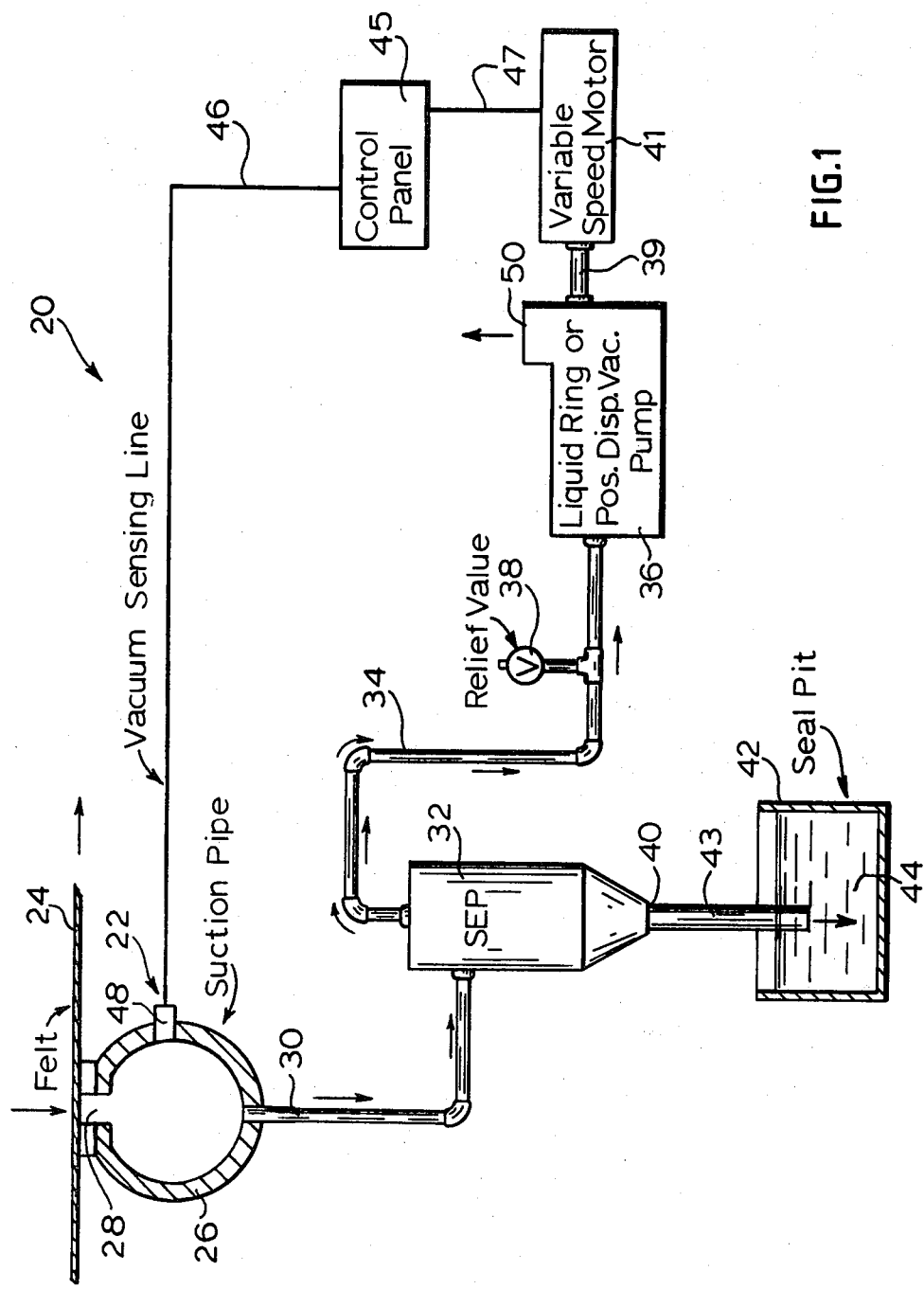
FIG. 1 is a schematic view of the vacuum control system incorporated as part of the section of a papermaking machine employing suction pipes.

The depicted portion 20 of a well known type of papermaking machine is that part of the press end of the machine employing one or more suction pipes 22 for dewatering a press felt 24 or similar fabric. This is a common arrangement at the press section of the papermaking machine.

Each suction pipe 22, as is well known, includes a hollow conduit 26 with a slot 28 forming an opening in its upper end. An exit conduit 30 passes to a conventional type of liquid and gas separator 32. The separator is connected by conduit 34 to a vacuum pump 36 such as a conventional type of liquid ring or positive displacement vacuum pump. Conventionally in the system, a relief valve 38 is in the line between the separator and the vacuum pump for vacuum relief purposes when needed. Separator 32 has a bottom exit 40 for passage of separated liquid into a seal pit 42 through a drop leg 43. In the drawing, water 44 collected by the dewatering process is shown in seal pit 42.

A conventional drive shaft 39 interconnects a variable speed drive motor 41 with the vacuum pump 36 to adjust and drive the vacuum pump at a chosen variety of speeds depending upon vacuum conditions in the hollow interior of suction pipe 22. A conventional electrical control panel 45 is connected by wire 47 to the variable speed drive motor to control the motor and accordingly the speed of the pump 36. The controls are also electrically through connector 46 to a well known type of electrical or pneumatic vacuum sensor 48 mounted on the suction pipe so as to measure the level of vacuum on the interior of the pipe at any given point in time.

The above system is similar to well known dewatering systems used in mills today with the exception of the variable speed drive motor 41 and interconnected controls 45 to adjust the speed of pump 36.

In operation, the system is set up as shown in FIG. 1 and the controls are adjusted to react to a setting of the maximum vacuum required to dewater a given felt such as felt 24 at its minimum felt permeability. Once this vacuum point has been set, vacuum pump 36 will run at its maximum speed when felt 24 is new. The felt passes, as shown by the arrow, from left to right across slot 28. Suction in suction pipe 22 draws air and water through and from felt 24 into a hollow interior of suction pipe 22 as the felt passes over slot 28. This combination of air and water then passes through exit conduit 30 into the separator 32 where the water and air are separated. The water drains through bottom exit opening 40 into the seal pit 42 through drop leg 43. The separated air still subjected to vacuum is drawn through conduit 34 into the pump 36 and exits to atmosphere through exit opening 50 of the vacuum pump. This path of travel is depicted by the arrows in FIG. 1.

As stated, once the vacuum point has been set in regard to the control panel, the vacuum pump 36 will run at its maximum speed when the felt is new. As the felt permeability decreases in time, the vacuum level at the suction pipe 22 will automatically increase because vacuum pump 36 is a constant volume unit. All this time vacuum pump 36 will run at its maximum speed, until the vacuum level has reached the set point at the controller 45. Sensor 48 detects the vacuum conditions in suction pipe 22 during this entire period of time and the controls 45 are responsive to the vacuum sensed by sensor 48. To maintain this desired maximum vacuum level at suction pipe 22, vacuum pump 36 will then start to slow down as the felt permeability decreases. Thus, the controls include a first control means and a second control means. The first control means operates the pump at its initial high speed until the maximum vacuum level has been reached. Then, operation of the first control means is terminated and the second control means lowers the speed of the pump as the felt permeability decreases thereafter. This is accomplished by the electrical connector 47 between control panel 45 and the variable speed drive motor 41. The controls cause the drive motor to lower the speed of the pump 36. Lower pump speeds result in lower drive horsepower consumed. Accordingly, the power requirements of vacuum pump 36 in many instances will almost be half of what they would be in a conventional system without the variable speed motor and appropriate controls toward the end of a given felt life.

Figure 2:
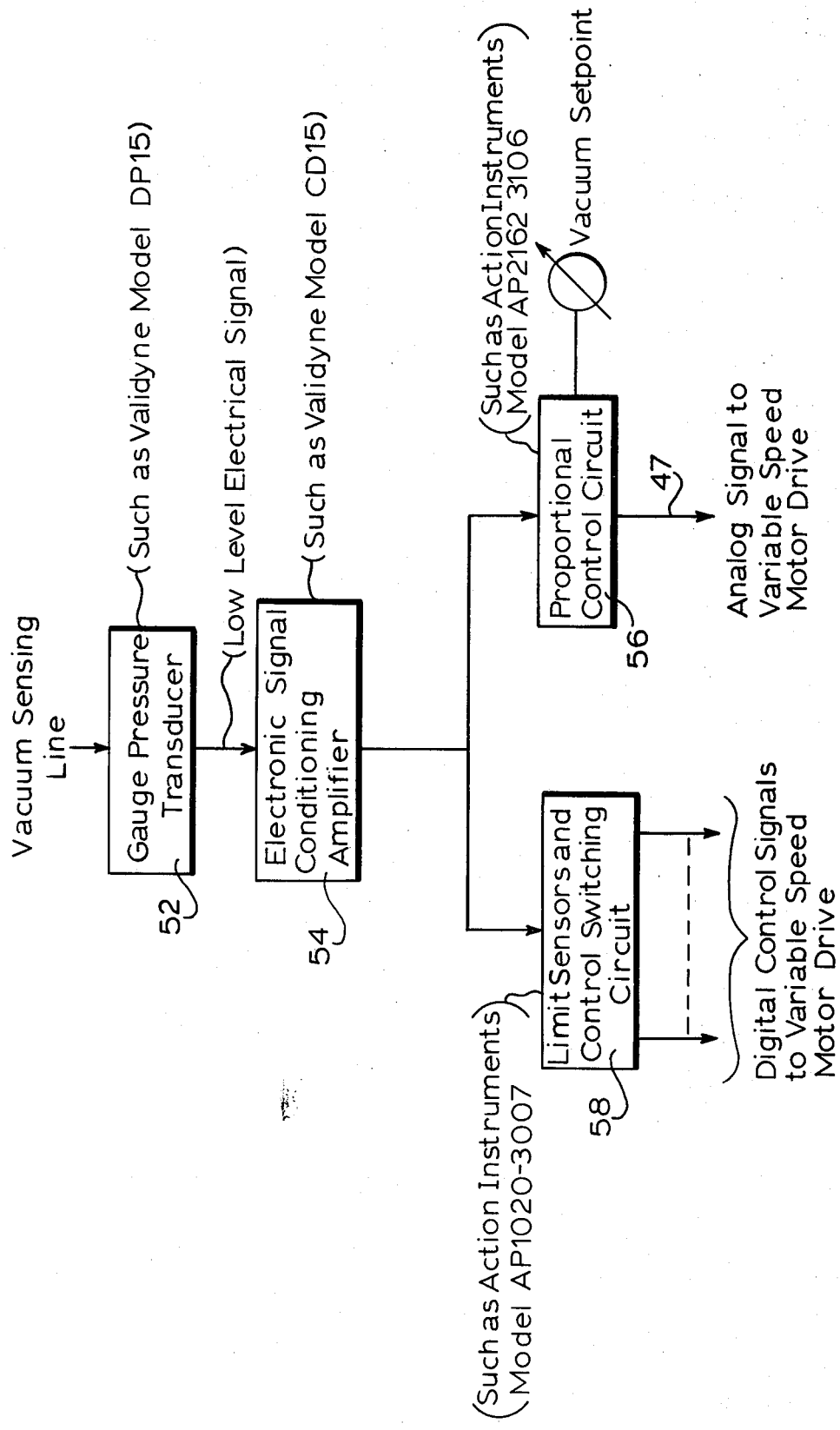
FIG. 2 is a block diagram of the controls of the vacuum control system of the invention.

Electrical panel 45 operates in the following manner as depicted in FIG. 2. The vacuum level in the vacuum sensing line 46 is converted to a low level electrical signal by a common gauge pressure transducer 52. This low level signal is amplified by a signal conditioning amplifier 54, which may also have a non-linear gain characteristics, if desired. In this way, the non-linear air flow characteristics of the pump or exhauster may, in affect be linearized. This permits stable control over a wider range of air flows than would be possible without non-linear gain.

The amplified signal is presented to a proportional control circuit 56 of a conventional design. The set point adjustment of this control circuit permits setting of the vacuum level to be maintained. The output signal from this proportional control circuit 56 is used as the speed control signal through line 47 into the variable speed motor drive 41.

In addition to controlling pump motor speed in normal operation, the controls must protect the pump and motor from abnormal conditions. Circuitry 58 consisting of limit sensors and digital logic gates provides orderly and safe shutdown in such circumstances. These circuits also control system startup. Digital signals from the circuits are connected directly to control imputs on the variable speed motor drive 41.

Conventional elements are available for all portions of the above described circuitry. For example, acceptable for the gauge pressure transducer 52 is a Model DP15 manufactured by Validyne Engineering Corporation of Northridge, California 91324. Model CD 15 of the same company would operate successfully as the electronic signal conditioning amplifier 54. Proportional control circuit 56 would be satisfied, for example, by Model AP 2162-3106 of Action Instruments Co., Inc. of San Diego, California 92123. An example of acceptable circuitry for the unit sensor and control switching circuit 58 is Model AP 1020-3007 of the same Action Instruments Co., Inc.

The following table shows the improved reduction in energy consumption by the present system in contrast to a conventional system. The table readings relate to a suction pipe including two one-half inch slots with a maximum vacuum required of 13 inches Hg. The press location is the third press of the press section of a papermaking machine. The moisture contents before MP1 and after MP2 suction pipes are respectively 0.6 H$_2$O/felt and 0.54 H$_2$O/felt. The system was designed to remove 0.06 H$_2$O/felt of shower water. The felt permeability was 60 New, the felt width 230" and the machine speed 2450 fpm.

| | Conventional System | | | | New Variable Speed Vacuum Pump System | | | | |
| --- | --- | --- | --- | --- | --- | --- | --- | --- | --- |
| Perm. | P("Hg) | acfm Pump | Nash 4001 Speed | HP | ΔP("Hg) | acfm Pump | 4001 | HP | MP1 | MP2 |
| 60 | 9.2 | 4400 | 400 | 170 | 9.19 | 4400 | 400 | 170 | .6 | .54 |
| 50 | 10.5 | 4400 | 400 | 175 | 10.5 | 4400 | 400 | 175 | .57 | .51 |
| 40 | 12.5 | 4380 | 400 | 190 | 12.5 | 4380 | 400 | 190 | .54 | .48 |
| 35 | 13.0 | 4340 | 400 | 190 | 13.0 | 4065 | 375 | 165 | .53 | .47 |
| 30 | 13.0 | 4340 | 400 | 190 | 13.0 | 3527 | 327 | 130 | .54 | .48 |

-continued

| | Conventional System | | | | | New Variable Speed Vacuum Pump System | | | | |
|---|---|---|---|---|---|---|---|---|---|---|
| Perm. | P("Hg) | acfm Nash 4001 Pump | Nash 4001 Speed | HP | ΔP("Hg) | acfm Pump | 4001 | HP | MP1 | MP2 |
| 20 | 13.0 | 4340 | 400 | 190 | 13.0 | 2405 | Min. Less Than 300 rpm | 100 Est. | .56 | .50 |
| 15 | 13.0 | 4340 | 400 | 190 | 13.0 | Min. Flow | | 100 Est. | .6 | .54 |

Permeability equals the air flow in CPM/sq. ft. at ½ inch H₂O pressure drop

MP1 equals moisture content before suction pipe in lbs. H₂O/lb. felt
MP2 equals moisture content after suction pipe in lbs. H₂O/lb. felt note:
above calculations based upon "Experimentally Equations for Water Removal in the Press Section, Suction Box Dewatering" TAPPI 100-106 56 #11 (Nov 1973)

From the above comparison Table, it is apparent that the vacuum pump drive power requirements decreased after the felt permeability reached 35 versus remaining constant (at a maximum) with a conventional system. Depending upon machine conditions, one can expect approximately 25% overall reduction in vacuum pump drive power consumption over its entire felt life.

It is possible to use a centrifugal exhauster for the vacuum pump, however, the energy savings would not be as great because the vacuum level changes with speed.

Conventional equipment can be used as part of the system. For example, a vacuum pump manufactured by the Nash Engineering Company of Norwalk, Connecticut, would be acceptable. Also Hoffman Air And Filtration Systems of Syracuse, New York supplies equally acceptable vacuum pump equipment. An example of an acceptable variable drive motor is one which is known as a variable frequency drive and is manufactured by Parametrics of Orange, Connecticut.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. A vacuum dual control system for dewatering a press felt on a papermaking machine comprising; a suction pipe, a vacuum pump operatively connected to the suction pipe in a manner so that the vacuum applied to the pipe is a function of the speed of the pump and said vacuum pump operated by first control means to run at an initial substantially constant high speed for providing vacuum necessary to dewater said press felt at its new felt permeability, means for setting the pump to run at a substantially constant maximum speed for a new felt permeability, means for passing the felt over a slot in the suction pipe so that suction applied therethrough by the pump operating at its initial substantially constant high speed will dewater the felt until felt permeability decreases sufficiently to cause the vacuum level in the suction pipe to increase to a predetermined maximum level as determined by a set point of a second control means, and the second control means connected to the suction pipe and to the vacuum pump and including sensing means to sense the vacuum level reaching the maximum level as determined by the second control means set point, and means for terminating operation of said first control means and initiating operation of said second control means in response to the sensing means sensing the vacuum level reaching the predetermined maximum level as determined by the second control means set point said second control means including means to lower the speed of the vacuum pump and maintain said predetermined maximum vacuum level.

2. The invention in accordance with claim 1 wherein the second control means includes a variable speed motor for operating the vacuum pump.

3. The invention in accordance with claim 1 wherein the vacuum pump is a liquid ring pump.

4. The invention in accordance with claim 1 wherein the vacuum pump is a positive displacement vacuum pump.

5. The invention in accordance with claim 1 wherein the second control means includes a vacuum sensing line interconnected with the interior of the suction pipe and connected with a variable speed motor for driving the vacuum pump.

6. The invention in accordance with claim 1 wherein a liquid separator is positioned between the suction pipe and the vacuum pump for separating the liquid and gas received from the suction pipe after dewatering of the felt.

7. The invention in accordance with claim 2 wherein the second control means includes a gauge pressure transducer responsive to the set point vacuum level to convert to a lower level electrical signal, a signal conditioning amplifier to amplify the low level electrical signal, a proportional control circuit to receive the amplified electrical signal and having a set point adjustment permitting setting of the vacuum level to be maintained, and the proportional control circuit connected to the variable speed drive motor so that the output signal from the proportional control circuit operates the variable speed drive motor for operating the vacuum pump.

8. A method of controlling vacuum conditions for dewatering a press felt on a papermaking machine by use of a dual control system comprising; interconnecting a suction pipe with a vacuum pump in a manner so that the vacuum applied to the pipe is a function of the speed of the pump, operating the vacuum pump by a first controller to run the pump at an initial substantially constant high speed for providing vacuum necessary to dewater said press felt at its new felt permeability, passing the felt over a slot in the suction pipe so that suction applied therethrough by the pump operating at its initial high speed will dewater the felt until felt permeability decreases sufficiently to cause the vacuum in the suction pipe to increase to a predetermined maximum level as determined by a set point of a second controller connected to the suction pipe and to the vacuum pump and including a sensor to sense the vacuum level reaching the maximum level as determined by the second controller set point, and lowering the speed of the vacuum pump to maintain the maximum vacuum level by terminating use of the first controller and instituting use of the second controller in response to the sensor sensing the vacuum level reaching the maximum level as determined by the second controller set point.

9. The invention in accordance with claim 8 wherein the second controller includes a variable speed motor for operating the vacuum pump.

10. The invention in accordance with claim 8 wherein the vacuum pump is a liquid ring pump.

11. The invention in accordance with claim 8 wherein the vacuum pump is a positive displacement vacuum pump.

12. The invention in accordance with claim 8 wherein the second controller includes a vacuum sensing line interconnected with the interior of the suction pipe and connected with a variable speed motor for driving the vacuum pump.

13. The invention in accordance with claim 8 wherein a liquid separator is positioned between the suction pipe and the vacuum pump for separating the liquid and gas received from the suction pipe after dewatering of the fabric.

14. The invention in accordance with claim 9 wherein the second controller includes a gauge pressure transducer responsive to the set point vacuum level to convert to a lower level electrical signal, a signal conditioning amplifier to amplify the lower level electrical signal, a proportional control circuit to receive the amplified electrical signal and having a set point adjustment permitting setting of the vacuum level to be maintained, and the proportional control circuit connected to the variable speed motor drive so that the output signal from the proportional control circuit operates the variable speed drive motor for operating the vacuum pump.

* * * * *